US010709208B2

(12) United States Patent
Geist

(10) Patent No.: US 10,709,208 B2
(45) Date of Patent: Jul. 14, 2020

(54) LOW PROFILE SNAP HOOK ACTUATOR FOR CHILD SEAT LATCH

(71) Applicant: Indiana Mills & Manufacturing, Inc., Westfield, IN (US)

(72) Inventor: Christopher Geist, Westfield, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 16/129,140

(22) Filed: Sep. 12, 2018

(65) Prior Publication Data

US 2019/0075891 A1  Mar. 14, 2019

Related U.S. Application Data

(60) Provisional application No. 62/557,992, filed on Sep. 13, 2017.

(51) Int. Cl.
| | |
|---|---|
| *F16B 45/02* | (2006.01) |
| *A44B 11/25* | (2006.01) |
| *A44B 13/02* | (2006.01) |
| *B60N 2/28* | (2006.01) |
| *F16B 45/00* | (2006.01) |

(52) U.S. Cl.
CPC .......... *A44B 11/2526* (2013.01); *A44B 13/02* (2013.01); *B60N 2/2806* (2013.01); *B60N 2/2887* (2013.01); *F16B 45/02* (2013.01); *F16B 45/00* (2013.01)

(58) Field of Classification Search
CPC ... A44B 11/2526; A44B 13/02; B60N 2/2806; Y10T 24/45079; Y10T 24/45084; Y10T 24/45099; Y10T 24/45335; Y10T 24/45408; Y10T 24/45429; F16B 45/025; F16B 45/02

See application file for complete search history.

(56) References Cited

U.S. PATENT DOCUMENTS

| | | | | |
|---|---|---|---|---|
| 1,180,387 | A | * | 4/1916 | Farrand .................. F16B 45/02 24/599.4 |
| 1,456,264 | A | * | 5/1923 | Billmeyer ............... F16B 45/02 24/600.9 |
| 5,005,263 | A | * | 4/1991 | Barrett ................... G02C 3/006 24/3.3 |
| 6,948,219 | B2 | | 9/2005 | Kakuda et al. |

* cited by examiner

*Primary Examiner* — Robert Sandy
*Assistant Examiner* — Michael S Lee
(74) *Attorney, Agent, or Firm* — Woodard, Emhardt, Henry, Reeves & Wagner, LLP

(57) ABSTRACT

A snap hook assembly includes a base assembly that has a hook at one end. A lever assembly including an actuation mechanism and an arm assembly fits through an opening defined through the base assembly. The arm assembly is positioned on one side of the base assembly and the actuation mechanism of the lever assembly is positioned on the opposite side of the base assembly. The actuation mechanism is fit within a housing so that the lever assembly may pivot with respect to the base assembly. A clasp is attached to the base assembly so that an end of the clasp is biased to contact the hook of the base assembly. When the lever assembly pivots, the arm assembly contacts and rotates the clasp to create a gap between the clasp and the hook.

47 Claims, 9 Drawing Sheets

LOW PROFILE SNAP HOOK ACTUATOR FOR CHILD SEAT LATCH

CROSS-REFERENCE TO RELATED APPLICATION

This application claims the benefit of U.S. Provisional Application No. 62/557,992 filed Sep. 13, 2017, which is hereby incorporated by reference.

BACKGROUND

It is required by law for children of certain ages and heights to ride in a car seat. Car seats improve safety and can help prevent injuries in the case of an accident. A car seat is secured to a vehicle using straps and several different anchor points positioned at different locations on a vehicle seat. Some of these anchors may be located in the crevice between the seat and the seat back. Often, these anchors may be difficult to access as this crevice may not offer a large amount of space for a person attempting to anchor the car seat. Therefore, an improvement in this field is needed.

SUMMARY

A snap hook assembly is designed to tether or otherwise secure an object, such as a car seat, a car seat base, or booster seat, to an anchoring system, such as a Lower Anchors and Tethers for Children (LATCH) system. The snap hook assembly has a unique low profile design that is easy to assemble as well as to engage and disengage from the LATCH system. To facilitate this, the assembly includes a base that is hook shaped. The hook of the base forms a basket in which the LATCH system anchor is secured, and the end of the hook forms a nose. A gate in the form of a spring is secured to the base. In one example, the gate is in the form of a metal strip that is biased to engage the nose of the hook so as to close the gate opening of the snap hook and prevent disengagement of the snap hook from the LATCH system. A gate actuator in the form of the lever has an actuation portion located on the side and end opposite the hook. In one example, the actuation portion is generally in the form of a button that can be pressed by a user. The gate actuator includes an actuation arm that is configured to contact and move the gate into an open position when the button is actuated. In one form, the gate actuator has a single actuation arm that extends in a parallel manner with the gate, and the actuation arm has a width that is narrower than the width of the base. In other words, the actuator arm is covered by the base such that the actuator arm does not longitudinally and laterally extend past the base so as to reduce the risk of the snap hook inadvertently catching on something during installation or removal.

With the gate being resilient or spring-like, the actuation portion is readily biased back without the need of another biasing spring. This in turn reduces the overall force needed by the user to actuate the button, and it further reduces the number of components needed for assembly. The actuation portion of the gate actuator can also have a lower profile because there is no need to have a space normally required for a separate button bias spring. Having the gate formed from a metallic spring also addresses a number of issues. The metallic spring gate provides sufficient strength to retain the LATCH anchor. As a result, the actuation arm does not need to be over-engineered to bear the load for retaining the anchor, and in turn, the gate actuator member can be made smaller so as to have a lower profile. Moreover, the gate actuator can be made from lower strength and/or lower weight materials, such as plastic. Normally, but not always, the LATCH anchor is positioned in hard to reach and/or tight spaces, such as between cushions or behind the head rest. As should be recognized the lower profile of this design makes it easier for the user to install and remove the snap hook assembly from these hard to reach and confined spaces.

In one example the snap hook assembly includes a base having a hook with a nose and a gate secured to the base. The gate has a nose end biased to contact the nose of the hook. A gate actuator has an actuator arm positioned to contact the gate and an actuator portion connected to the actuator arm. The actuator arm is moveable from a closed position where the gate is closed against the nose of the hook to an open position where the actuator arm opens the gate away from the nose. The actuator portion is configured to move the actuator arm from the closed position to the open position when actuated. The gate is made of resilient material that biases the nose end into contact with the nose of the hook in the closed position and biases the actuator portion.

In another example, the snap hook assembly includes a base assembly that has a top surface and a bottom surface and a hook at one end. A lever opening is defined through the base assembly. The snap hook assembly also includes a lever assembly that has an actuation mechanism including a pin and an arm assembly. The arm assembly extends through the lever opening in the base assembly.

A housing is attached to the top surface of the base assembly. A pin opening is defined in the housing and configured to receive the pin of the lever assembly. When the pin of the lever assembly is situated within the pin opening, the lever assembly is configured to pivot with respect to the housing about the pin.

A clasp is attached to the bottom surface of the base assembly, and the clasp is biased to contact the hook of the base assembly when the snap hook assembly is in a closed position. When the lever assembly pivots about the housing and moves the clasp to an open position, the arm assembly contacts the clasp, causing the clasp to pivot with the arm assembly. When the clasp pivots, a gap is formed between the clasp and the hook and an anchor for anchoring a car seat may be inserted through the gap.

Aspect 1 concerns a snap hook assembly, including a base having a hook with a nose; a gate secured to the base, the gate having a nose end biased to contact the nose of the hook; a gate actuator having an actuator arm positioned to contact the gate and an actuator portion connected to the actuator arm, wherein the actuator arm is moveable from a closed position where the gate is closed against the nose of the hook to an open position where the actuator arm opens the gate away from the nose, wherein the actuator portion is configured to move the actuator arm from the closed position to the open position when actuated; and wherein the gate is made of resilient material that biases the nose end into contact with the nose of the hook in the closed position and biases the actuator portion.

Aspect 2 concerns the assembly of any previous aspect, wherein the gate includes a metal strip; the base is metallic; and the gate actuator is plastic.

Aspect 3 concerns the assembly of any previous aspect, wherein the base is wider than the actuator arm.

Aspect 4 concerns the assembly of any previous aspect, wherein the actuator portion is positioned on a side of the base opposite the hook.

Aspect 5 concerns the assembly of any previous aspect, wherein the base defines a lever opening; and the actuator arm extends from the actuation portion through the lever opening.

Aspect 6 concerns the assembly of any previous aspect, further comprising a housing secured to the base; and wherein the gate actuator is pivotally coupled to the base.

Aspect 7 concerns the assembly of any previous aspect, further comprising a rivet securing the housing and the gate to the base.

Aspect 8 concerns the assembly of any previous aspect, wherein the actuator arm includes a ridge configured to guide an anchor and open the gate during securing.

Aspect 9 concerns the assembly of any previous aspect, wherein the gate actuator has a stop flange; and the housing has a stop tab configured to engage the stop flange to limit movement of the gate actuator against a biasing force of the gate.

Aspect 10 concerns an assembly including a base assembly including a top surface and a bottom surface and a hook at one end of the base assembly, wherein the base assembly defines a lever opening; a lever assembly including an actuation mechanism including a pin, and an arm assembly extending through the lever opening in the base assembly; a housing attached to the top surface of the base assembly defining a pin opening configured to receive the pin of the lever assembly, wherein the lever assembly is configured to pivot with respect to the housing about the pin when the pin is in the pin opening; a clasp attached to the bottom surface of the base assembly; wherein the clasp is biased to contact the hook of the base assembly in a closed position; and, wherein the arm assembly is configured to contact the clasp when the lever assembly pivots about the housing and move the clasp to an open position, and wherein there is a gap between the clasp and the hook in the open position.

Aspect 11 concerns the assembly of any previous aspect, wherein the gap between the clasp and the hook is configured to receive an anchor.

Aspect 12 concerns the assembly of any previous aspect, wherein the lever assembly is configured to pivot about the housing when force is applied to the actuation mechanism.

Aspect 13 concerns the assembly of any previous aspect, wherein the clasp is made from a resilient material.

Aspect 14 concerns the assembly of any previous aspect, wherein the base assembly includes a rivet opening and the housing includes a rivet opening, and wherein the base assembly rivet opening aligns with the housing rivet opening when the housing is attached to the base assembly.

Aspect 15 concerns the assembly of any previous aspect, wherein the lever opening is pentagonal.

Aspect 16 concerns the assembly of any previous aspect, wherein the arm assembly includes a lower ridge and wherein the lower ridge is angled so that the lower ridge has a greater height at a portion of the arm assembly closer to the lever opening than at the end of the arm assembly further away from the lever opening.

Aspect 17 concerns the assembly of any previous aspect, wherein the hook includes a foot surface and wherein the clasp contacts the hook at the foot surface.

Aspect 18 concerns the assembly of any previous aspect, wherein the base assembly defines a strap opening configured to receive a strap from a child safety seat to secure the assembly to the child safety seat.

Aspect 19 concerns the assembly of any previous aspect, further comprising at least one tab extending from the housing, wherein the tab is configured to fit within the lever opening when the housing is attached to the base assembly; at least one flange extending from the arm assembly; and wherein the flange contacts the tab when the clasp contacts the hook of the base assembly in the closed position.

Aspect 20 concerns a method of installing and/or removing the assembly of any previous aspect.

Aspect 21 concerns a method of manufacturing the assembly of any previous aspect.

Aspect 22 generally concerns a snap hook assembly, including a base having a hook; a gate having a fixed end secured to the base and a free end extending from the fixed end towards the hook, wherein the gate is resiliently biased to a closed position where the free end of the gate closes against the hook; and a gate actuator having an actuator portion and an arm contacting the gate, wherein the arm is configured to move the gate from the closed position to an open position where the free end of the gate disengages from the hook.

Aspect 23 generally concerns the assembly of any preceding aspect, further including a housing secured to the base, wherein the housing defines one or more pivot pin openings; and wherein the gate actuator includes an actuator portion to manually actuate the gate actuator, one or more pivot pins pivotally secured in the pivot pin openings of the housing; and an arm contacting the gate to move the free end from the closed position to the open position.

Aspect 24 generally concerns the assembly of any preceding aspect, further including a single fastener securing the housing, the base, and the gate together.

Aspect 25 generally concerns the assembly of any preceding aspect, wherein the housing is secured to the base on a side that is opposite the hook; the actuator portion is located on the same side of the base as the housing; the base defines a base lever opening; and the arm extends through the base lever opening to engage the gate proximal to the hook.

Aspect 26 generally concerns the assembly of any preceding aspect, wherein the housing defines a housing lever opening; the arm extends through the housing lever opening. The housing has one or more tabs that extend through the base lever opening, and the arm has one or more stop flanges configured to engage the tabs to limit movement of the arm.

Aspect 27 generally concerns the assembly of any preceding aspect, wherein the arm has a gate facing flange and a support rib arranged in a T-shaped configuration. The support rib tapers towards the hook.

Aspect 28 generally concerns the assembly of any preceding aspect, wherein the lever opening has a pentagonal shape to receive the support rib.

Aspect 29 generally concerns the assembly of any preceding aspect, wherein the gate actuator extends through the base lever opening in a U-shaped curve from the pivot pins to the arm.

Aspect 30 generally concerns the assembly of any preceding aspect, wherein the pivot pins have beveled ends.

Aspect 31 generally concerns the assembly of any preceding aspect, wherein the base is wider than the arm.

Aspect 32 generally concerns a snap hook assembly, including a base having a web opening at one end and a hook at the opposite end. The web opening is configured to receive webbing of a restraint system, wherein the hook is configured to be secured to a vehicle anchor. A cantilevered spring has a fixed end secured to the base and a free end located opposite the fixed end. The free end of the cantilevered spring is resiliently biased to a closed position against the hook to retain the vehicle anchor in the hook. A lever is pivotally coupled to the base. The lever has an arm contacting the cantilevered spring proximal to the hook. The arm is configured to move the free end of the cantilevered spring from the closed position to an open position where the vehicle anchor is able to be received into the hook. The arm has an actuation portion positioned on a side of the base opposite the hook to allow a user to move the free end of the cantilevered spring from the closed position to the open position.

Aspect 33 generally concerns the assembly of any preceding aspect, wherein the hook has a foot portion with a foot surface located inside the hook. The cantilevered spring is a flat spring resiliently biased to contact the foot surface.

Aspect 34 generally concerns the assembly of any preceding aspect, wherein the cantilevered spring extends at an acute angle from the base to the foot portion of the hook. The arm has an end that engages the cantilevered spring between the free end and the fixed end. The arm is shorter than the hook and recessed from the from the hook to form a gap between the end of the arm and the foot portion of the hook. The cantilevered spring is exposed in the gap between the end of the arm and the foot portion of the hook to allow sliding engagement of the anchor to move the cantilevered spring to the open position.

Aspect 35 generally concerns the assembly of any preceding aspect, wherein the lever has a support rib that facilitates the lever acting as a class 3 lever type during the sliding engagement of the anchor.

Aspect 36 generally concerns the assembly of any preceding aspect, further including a housing pivotally coupling the lever to the base. The actuation portion is positioned relative to the housing and the arm to act as a class 1 lever type when the actuation portion is manually depressed.

Aspect 37 generally concerns the assembly of any preceding aspect, wherein the cantilevered spring biases the actuation portion to an undepressed position.

Aspect 38 generally concerns the assembly of any preceding aspect, wherein the arm is positioned to brace the cantilevered spring when in the closed position to reduce the risk of the free end of the cantilevered spring from being pried from the hook.

Aspect 39 generally concerns the assembly of any preceding aspect, wherein the housing has one or more tabs. The arm has one or more stop flanges configured to engage the tabs to limit movement of the arm.

Aspect 40 generally concerns the assembly of any preceding aspect, wherein the base defines a base lever opening; and the arm extends through the base lever opening.

Aspect 41 generally concerns the assembly of any preceding aspect, wherein the cantilevered spring has a clasp tab bent into the base lever opening.

Aspect 42 generally concerns a method, including opening a gate of a snap hook connector from a closed position against a hook to an open position by pressing an arm of a gate actuator against the gate that is resiliently biased to contact the hook. A vehicle anchor is inserted in a throat of the hook when the gate is in the open position. The anchor is retained in the hook by closing the throat of the hook with the gate through releasing force applied to the gate to move the gate to the closed position.

Aspect 43 generally concerns the method of any preceding aspect, wherein the gate is opened by manually actuating an actuator portion of the gate positioned in a side of the snap hook connector opposite of the gate.

Aspect 44 generally concerns the method of any preceding aspect, wherein the gate is opened by pressing the anchor against the arm of the gate actuator; and said inserting includes sliding the anchor along a portion of the arm and the gate.

Aspect 45 generally concerns a method, including securing a base, a cantilevered spring, and a housing together. The base includes a hook. The cantilevered spring is positioned to have a fixed end secured to the base and a free end resiliently biased to close the hook of the base. A lever is coupled to the housing in a pivotal manner. The lever has an arm and an actuation portion. The arm is positioned on a side of the base proximal the hook to engage the cantilevered spring, and the actuation portion is positioned on a side of the base that is opposite to the hook.

Aspect 46 generally concerns the method of any preceding aspect, wherein the base defines a base lever opening. The arm of the lever is inserted through the base lever opening.

Aspect 47 generally concerns the method of any preceding aspect, wherein the cantilevered spring has a clasp tab at the fixed end. The clasp tab is inserted into the base lever opening.

Aspect 48 generally concerns the method of any preceding aspect, wherein the cantilevered spring and housing is fastened to the base with a single fastener.

DESCRIPTION OF THE SELECTED EMBODIMENTS

Figure 1:
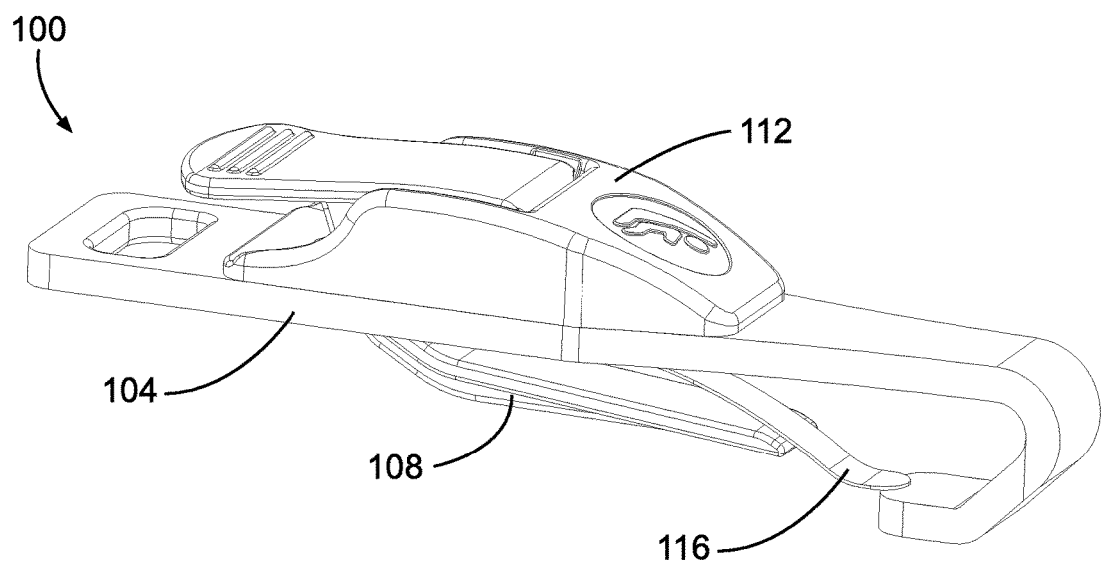
FIG. 1 is a perspective view of a snap hook assembly.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Child car seats are secured to the seat of a vehicle using a system of belts and hooks that attach to different anchor points on the vehicle seats. These anchor points may be hidden within the upholstery of the seats as they could be uncomfortable for a person sitting on the seat without a car seat. Because the anchor points may be hidden within the seats, it may become challenging to attach a hook to the anchor. Often, the anchor may not be able to be seen or may be difficult to reach.

FIG. 1 shows a perspective view of a snap hook assembly 100 for securing a child car seat to an anchor on the seat of a vehicle. The snap hook assembly 100 includes a base assembly 104 that attaches to the car seat by a strap or any other suitable attachment device. In some embodiments, the base assembly 104 may be made of a metal such as steel that provides enough strength to stay attached to the anchor on the vehicle seat without breaking in the event of a wreck or other sudden movements of the vehicle.

Figure 2:
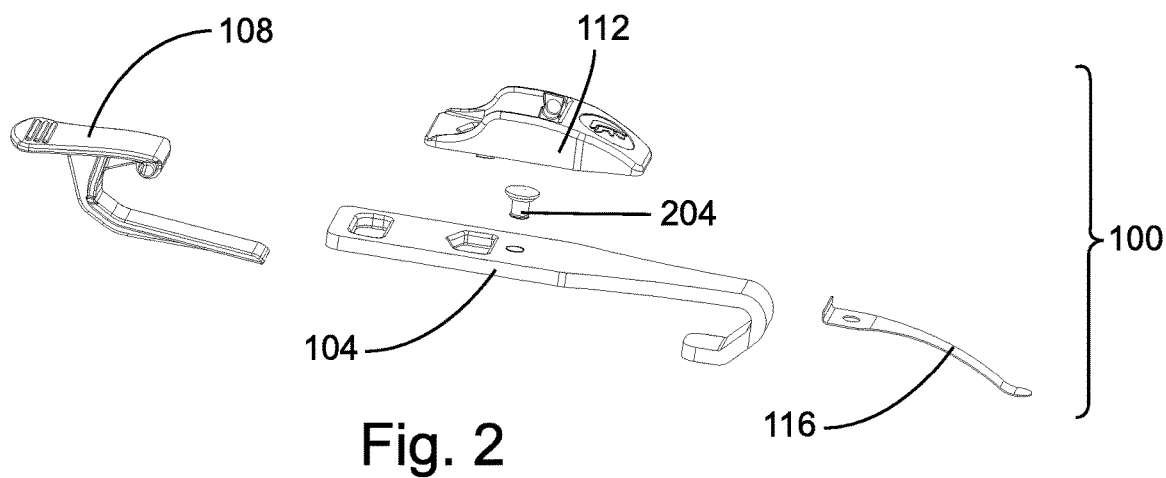
FIG. 2 is an exploded view of the snap hook assembly of FIG. 1.
Figure 3:
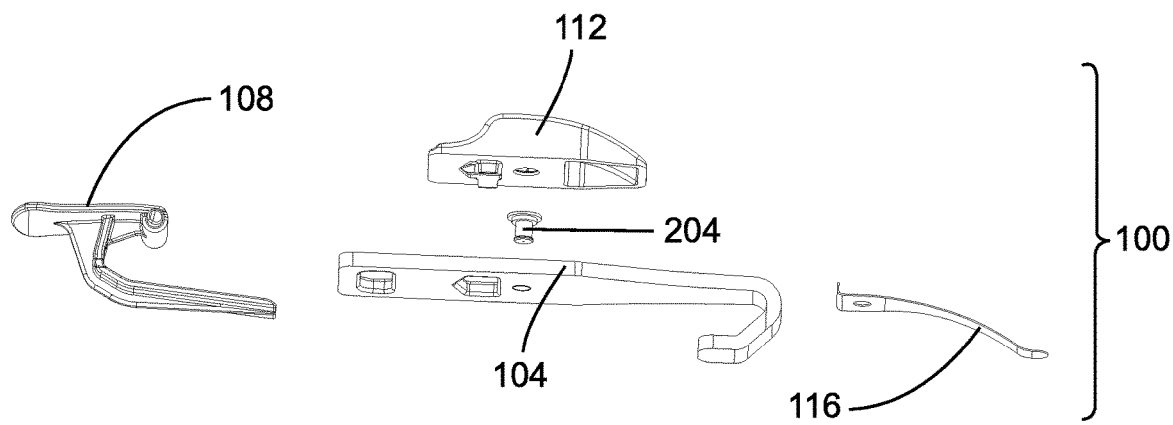
FIG. 3 is an exploded view of the snap hook assembly of FIG. 1.

A lever assembly or gate actuator 108 fits through an opening in the base assembly 104 so that a portion of the lever assembly 108 is positioned on one side of the base assembly 104 and a portion of the lever assembly 108 is positioned on the other side of the base assembly 104. A housing 112 sits on a top surface of the base assembly 104 and surrounds at least a portion of the lever assembly 108. The housing 112 is attached to the base assembly 104 by a fastener 204 (see FIGS. 2 and 3). In one example, the fastener 204 includes a rivet. The lever assembly 108 and the housing 112 may be made from any desired rigid material, such as plastic or a metal like steel or aluminum.

A clasp or gate 116 is attached to a surface of the base assembly 104 and extends between the base assembly 104 and the lever assembly 108. The clasp 116 may be made from a resilient material, allowing the clasp to bend with respect to the base assembly 104. In the illustrated example, the clasp 116 is in the form of a flat spring made of metal. More particularly, the flat spring forming the clasp 116 is a cantilever spring with one end fixed to the base assembly 104 and the other end being free to be biased in a closed position with the base assembly. As the clasp 116 bends, an opening is formed between the clasp 116 and the base assembly 104, allowing the snap hook assembly 100 to be in an open position in which the snap hook assembly 100 may receive the anchor on the seat of the vehicle and secure the car seat to the vehicle seat.

Figure 4:
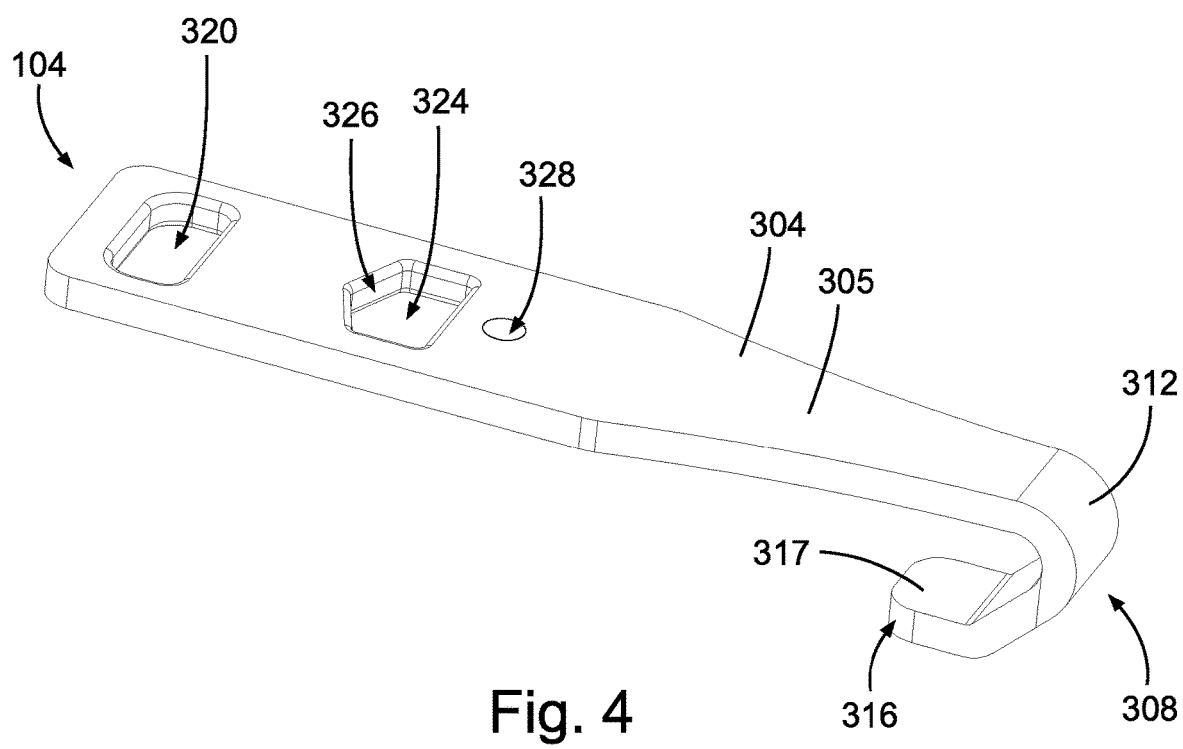
FIG. 4 is a top perspective view of a base assembly of the snap hook assembly of FIG. 1.
Figure 5:
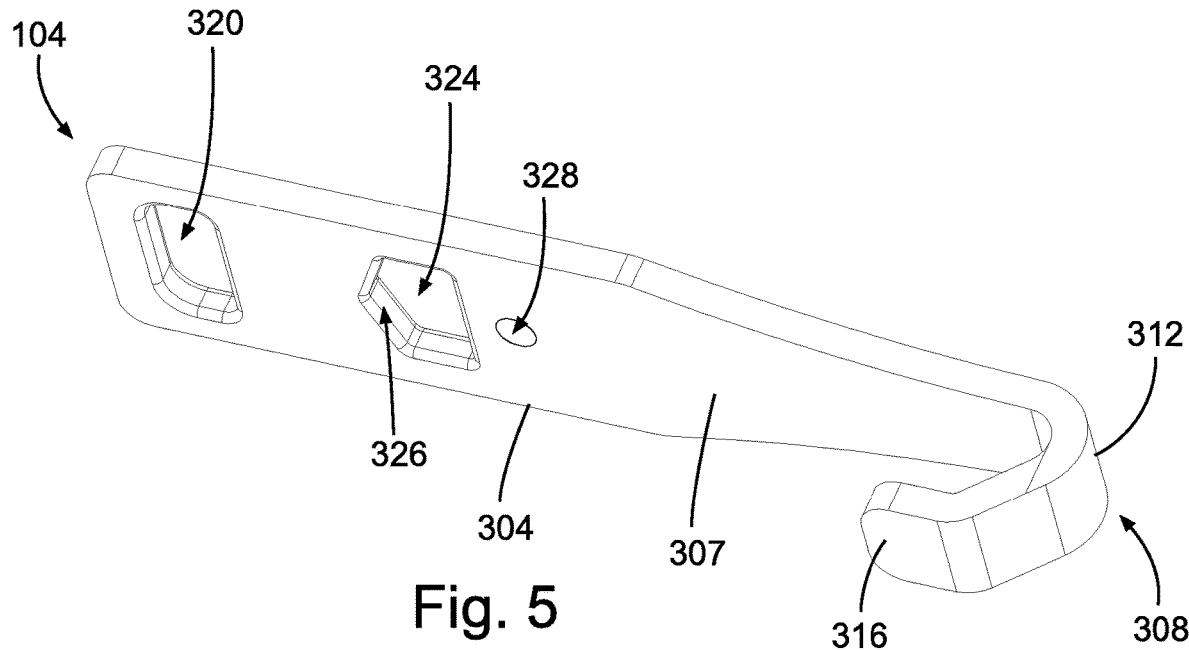
FIG. 5 is a bottom perspective view of the base assembly of FIG. 4.

As shown in FIGS. 4 and 5, the base assembly 104 includes a body portion 304. The body portion 304 includes a top surface 305 and a bottom surface 307. One end of the base assembly 104 includes a hook 308. The hook 308 includes a curved portion 312 and a foot portion or nose 316 that extends from an end of the curved portion 312. As shown in FIG. 1, the clasp or gate 116 has an end that contacts the inside of the foot portion 316. The foot portion 316 includes a foot surface 317. In some embodiments, the foot portion 316 may extend so that the foot portion 316 is substantially parallel to the body portion 304. In the illustrated example, the rivet 204 fastens one end of the gate 116 to the body portion 304. As can be seen, the free end of the gate 116 extends at an acute angle from the bottom surface 307 of the base assembly 104 towards the foot portion 316, and the gate 116 is resiliently biased to a closed position against the hook 308. When in the closed position, the free end of the gate 116 is biased against the foot surface 317.

One or more openings extend through the body portion 304 of the base assembly 104. A strap or web opening 320 is defined near the opposite end of base assembly 104 that does not include the hook 308. The strap opening 320 is sized to be able to receive a strap, web, band, buckle or other type of securement device for connecting the snap hook assembly 100 to a car seat or other object. A base lever opening 324 is defined through a central portion of the body portion 304. The base lever opening 324 is dimensioned to receive at least a portion of the lever assembly 108. The base lever opening 324 further has a cutout or relief section 326 configured to receive the rib that forms the connection and bend portions of the lever assembly 108, as will be discussed below. In the illustrated example, the cutout section 326 gives the base lever opening 324 an overall pentagonal shape to provide sufficient clearance for the lever assembly 108, but the base lever opening 324 can be shaped differently in other examples. The base lever opening 324 acts as a guide or brace for the lever assembly 108 to minimize lateral movement. In still yet other examples, the base lever opening 324 is eliminated, and part of the lever assembly 108 is designed to wrap around one or both exterior lateral sides of the base assembly 104 so that the lever assembly is able to engage the gate 116 on the other side.

A base rivet opening 328 is also defined through a central portion of the body portion 304. In some embodiments, the base rivet opening 328 may be positioned near the base lever opening 324, to the side of the base lever opening 324 that is closer to the hook 308.

Figure 6:
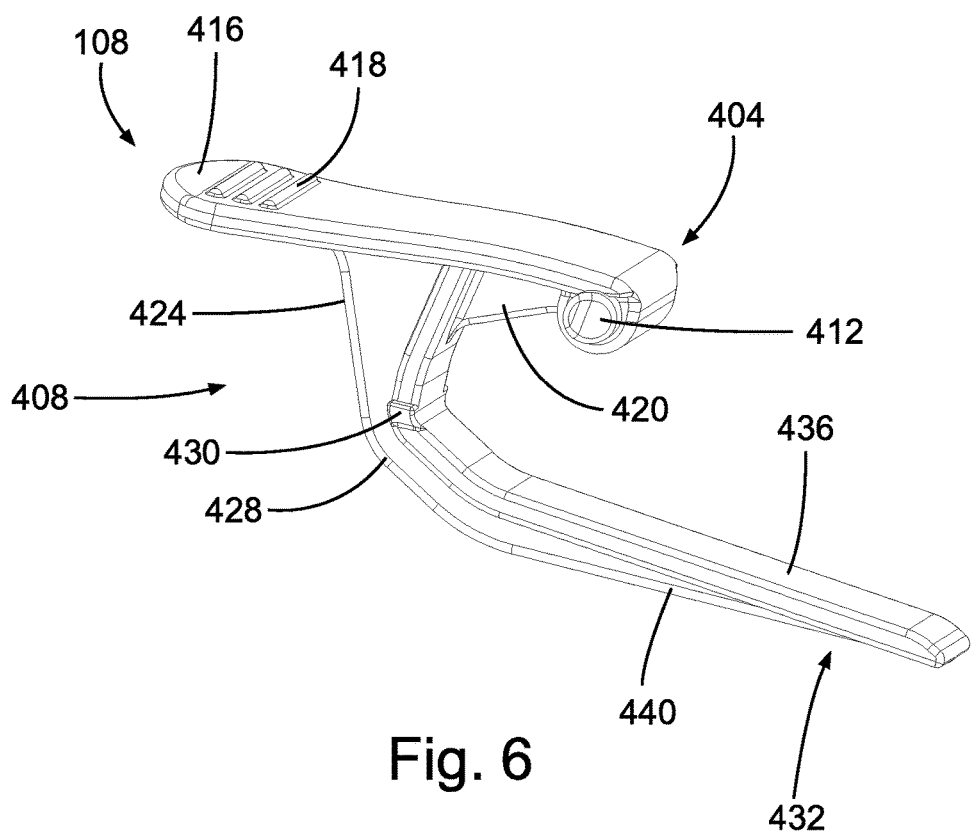
FIG. 6 is a perspective view of a lever assembly of the snap hook assembly of FIG. 1.
Figure 7:
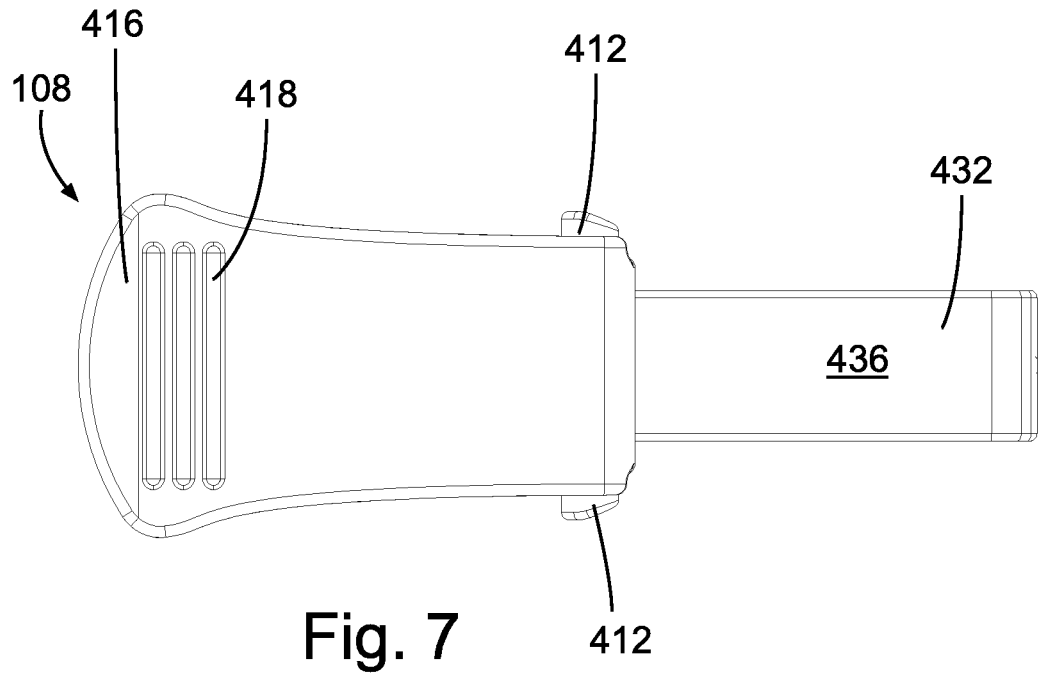
FIG. 7 is a top view of the lever assembly of FIG. 6
Figure 8:
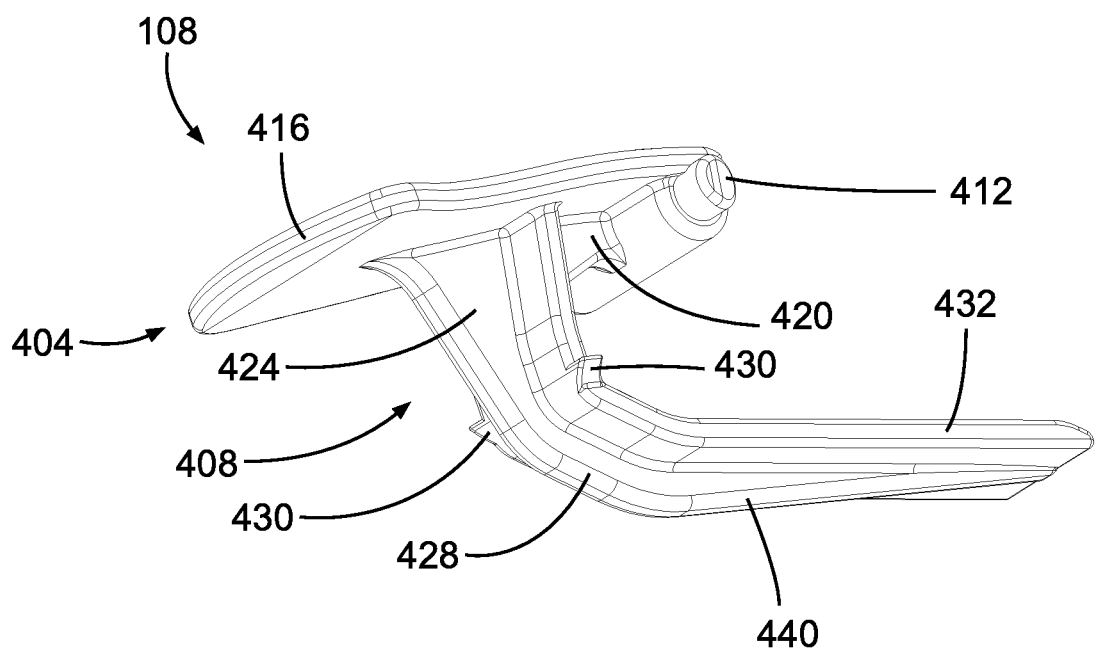
FIG. 8 is a bottom perspective view of the lever assembly of FIG. 6.

As illustrated in FIGS. 6, 7, and 8, the lever assembly 108 includes an actuation mechanism 404 and an arm assembly 408. The actuation mechanism 404 includes at least one pin 412 at one end and an actuator section or portion 416 in the form of a button at the other end. In the illustrated example, the actuation mechanism 404 has a pair of pins 412 disposed on opposite sides of the lever assembly 108. In the depicted example, the pins 412 have beveled ends that facilitate coupling of the lever assembly 108 to the housing 112. Once attached to the housing 112, the pins 412 form the fulcrum or pivot point about which the lever assembly 108 rotates. The button 416 may include a textured surface, such as ridges 418, that assists a user in maintaining a grip or contact with button 416. A linking piece 420 extending from the pin 412 connects the pin 412 to the arm assembly 408 of the lever assembly 108, allowing the arm assembly 408 to pivot as the rest of the lever assembly 108 pivots with respect to the housing 112 and the base assembly 104.

The arm assembly 408 includes a connection portion 424, a bend portion 428, and an arm 432. The connection portion 424 is attached to the actuation mechanism 404 and extends from the actuation mechanism 404. The arm 432 is attached to the connection portion 424 by the bend portion 428. The bend portion 428 curves so that the arm 432 is nearly parallel to the actuation mechanism 404. A stop flange 430 is positioned on each side arm assembly 408 near the point where the bend portion 428 connects to the connection portion 424.

The arm 432 has an upper gate facing surface or flange 436 and a lower support ridge or rib 440 (see FIG. 8). The gate facing surface 436 may be a generally flat, planar surface. As can be seen, the gate facing surface 436 and the support ridge 440 give the arm a T-shaped cross sectional shape. The lower ridge 440 in some embodiments may be angled so that the lower ridge 440 has a greater thickness near the bend portion 428 of the arm assembly 408 and a smaller thickness to almost no thickness near the end of the arm 432. The angled lower ridge 440 forms a camming surface that may guide objects which contact the lever assembly toward the end of the arm 432. With the relative location of the arm assembly 408, pins 412, and actuation section 416, the lever assembly 108 forms a class 1 lever for transmitting the force applied when the actuator section 416 is depressed by the user to counteract the resilient biasing force of the clasp 108 to open the snap hook assembly 100. The lever assembly 108 can also act as a class 3 lever to open the gate 116 without the user needing to depress the button 416. In this case, the user can simply press the arm 432 against the anchor which in turn opens the gate 116. As the user pulls the snap hook assembly 100 towards themselves, the lower ridge 440 of the arm 432 slides along the anchor. Upon reaching the gate 116, the anchor continues to hold the gate 116 until the anchor clears the gate 116. At this point, the gate 116 springs back to the closed position so as to retain the anchor in the hook 308.

Figure 9:
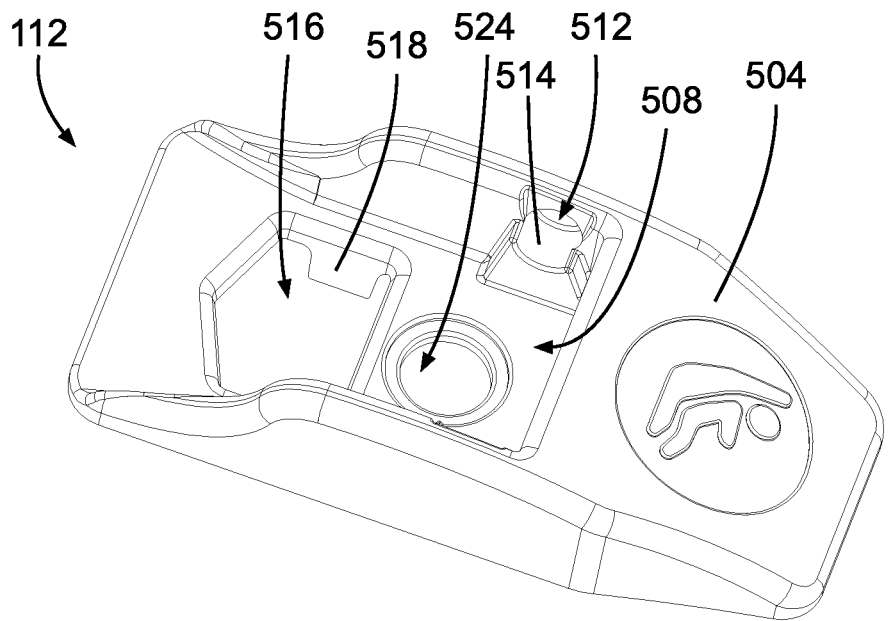
FIG. 9 is a perspective view of a housing of the snap hook assembly of FIG. 1.
Figure 10:
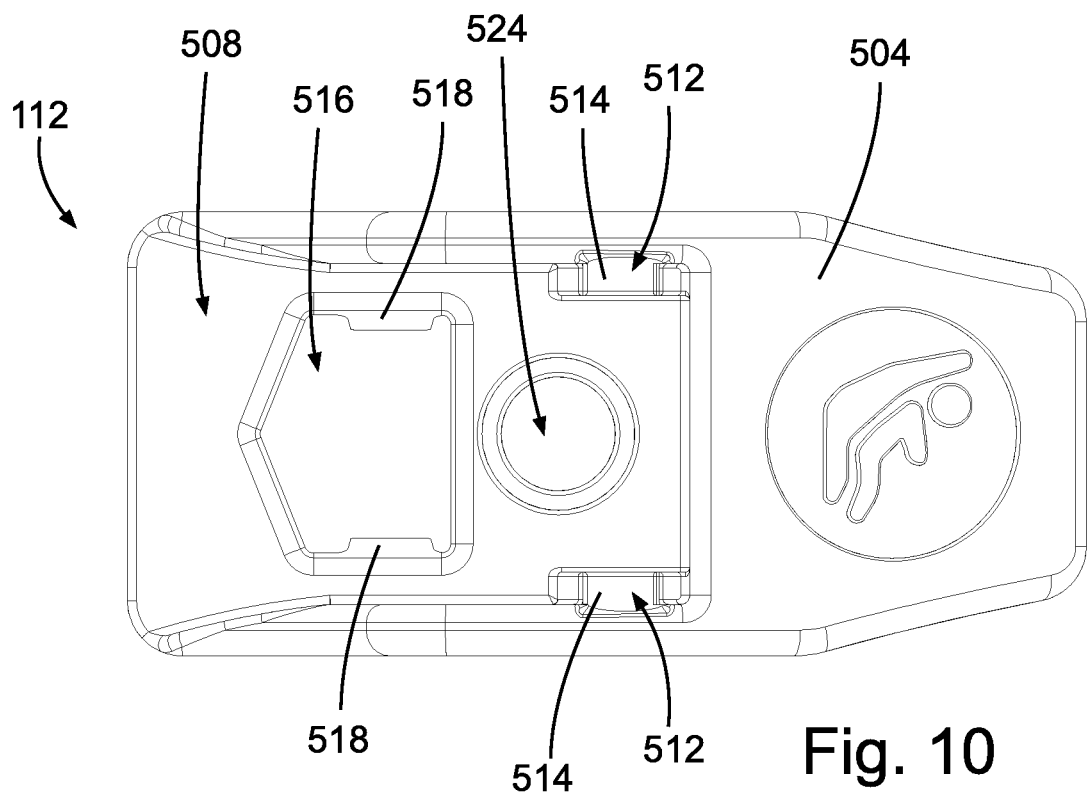
FIG. 10 is a top view of the housing of FIG. 9.
Figure 11:
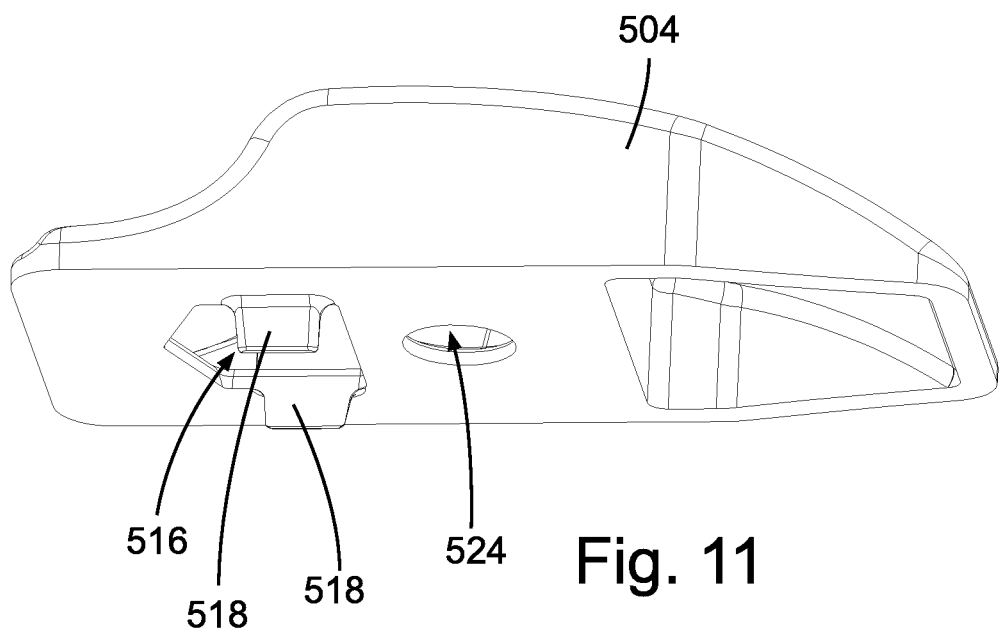
FIG. 11 is a bottom perspective view of the housing of FIG. 9.

The housing 112 is shown in FIGS. 9, 10, and 11. The housing 112 includes a body 504 that may be made from plastic, metal, or any other suitable material. The body 504 defines a housing cavity 508 that is dimensioned to allow at least a portion of the actuation mechanism 404 of the lever assembly 108 to fit within the housing cavity 508. One or more openings are defined within the body 504 within the housing cavity 508. A pin opening 512 is defined on each side of the body 504 for receiving the pin 412 of the arm assembly 408. A pin support surface 514 may extend from below the pin opening 512 to provide support for the pin 412.

Figure 12:
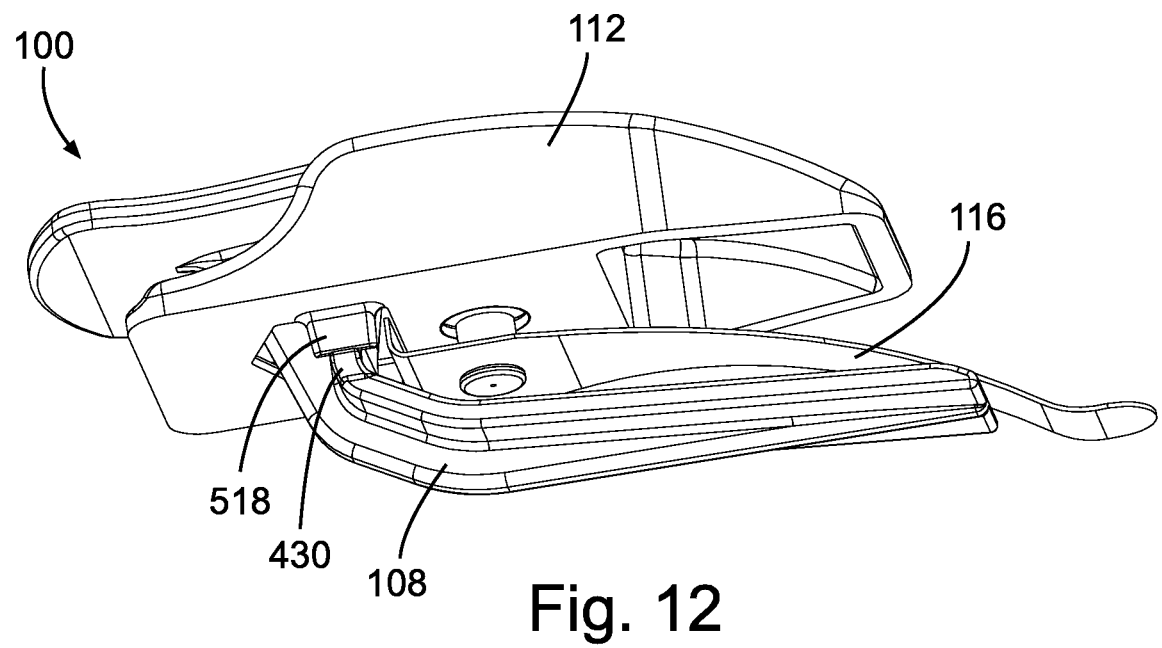
FIG. 12 is a perspective view of the lever assembly of FIG. 6 and the housing of FIG. 9 without the base assembly.

A housing lever opening 516 is also defined through housing 112. The housing lever opening 516 is positioned on the housing 112 so that when the housing 112 is secured on the base assembly 104, the housing lever opening 516 is aligned with the base lever opening 324. One or more tabs 518 may extend from body 504 at the edges of the housing lever opening 516. When the housing 112 is attached to the base assembly 104, the tabs 518 may extend through the base lever opening 324 and provide a stop for arm assembly 408 by contacting the flanges 430 on the arm assembly 408 (see FIG. 12) when the lever assembly 108 is inserted through the base lever opening 324 and the housing lever opening 516. The tabs 518 prevent the arm assembly 408 from being pulled through the lever openings 324, 516 as the lever assembly 108 pivots about pins 412.

The housing 112 also includes a housing rivet opening 524 that is defined through body 504. The housing rivet opening 524 is sized to allow a portion of the rivet 204 to fit through the housing rivet opening. The housing rivet opening 524 is positioned on the housing 112 so that when the housing 112 is secured on the base assembly 104, the housing rivet opening 524 is aligned with the base rivet opening 328.

Figure 13:
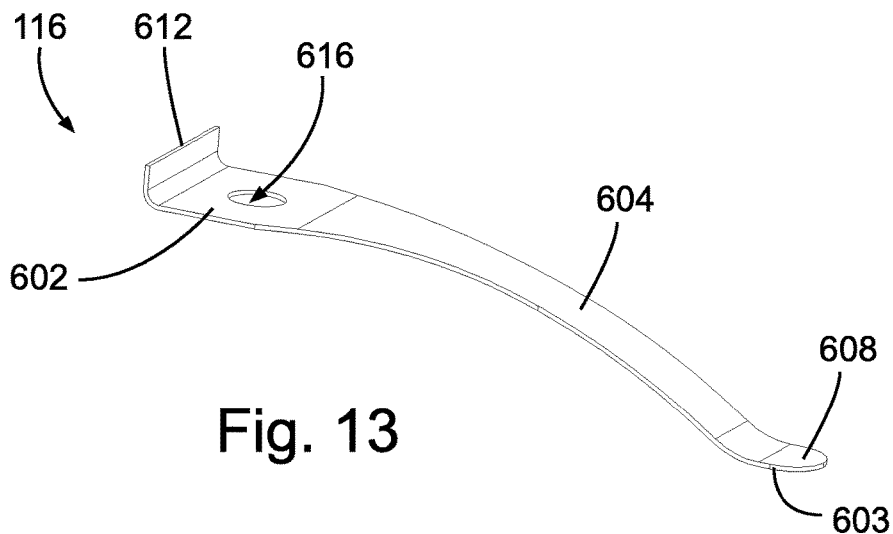
FIG. 13 is a perspective view of a clasp of the snap hook assembly of FIG. 1.

An embodiment of the clasp 116 is shown in FIG. 13. In the illustrated example, the clasp 116 includes a fixed end 602 that is secured to the base 104 and a free end 603 that is biased to close the hook 308. Between the fixed end 602 and the free end 603, the clasp 116 includes a curved clasp body 604; however, the clasp body 604 may be straight or angular in other embodiments. The clasp body 604 is made from a resilient material such as steel or another similar type of material. The free end 603 of the clasp body 604 includes a clasp foot 608. The fixed end 602 of the clasp 116 includes a clasp tab 612 which is almost perpendicular with respect to the clasp body 604. The clasp tab 612 is sized to be able to fit within base lever opening 324 and the housing lever opening 516. A clasp rivet opening 616 is defined through the clasp body 604, near the end of the clasp body 604 that includes the clasp tab 612. The clasp rivet opening 616 is positioned on clasp body 604 so that clasp rivet opening 616 aligns with the base rivet opening 328 and the housing rivet opening 524 when the clasp 116 is attached to the base assembly 104. When the clasp rivet opening 616 is aligned with the base rivet opening 328, the clasp tab 612 is configured to be positioned within the base lever opening 324 to help with alignment. Alternatively or additionally, the clasp tab 612 can act as a sliding surface to minimize arm wear on the gate 108 due to actuation.

Figure 14:
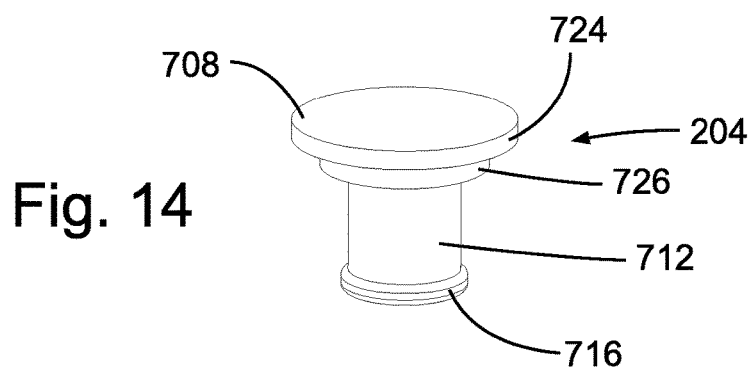
FIG. 14 is a perspective view of a rivet of the snap hook assembly of FIG. 1.

FIG. 14 illustrates an embodiment of the rivet 204. The rivet 204 includes a head 708, a shank 712, and a tail 716. The head 708 and the tail 716 of the rivet 204 each have a larger diameter than the shank 712. In the present embodiment, the head 708 also has a larger diameter than the tail 716. The shank 712 is dimensioned so that the diameter of the shank 712 is small enough to fit through the rivet openings 328, 524, and 616. The diameters of the head 708 and the tail 716 are larger than the diameters of the rivet openings 328, 524, and 616 to assist in preventing rivet 204 from being removed from the rivet openings 328, 524, and 616. In some embodiments, the head 708 of the rivet 204 may have portions 724, 726 that have varying diameters to improve the fit within housing rivet opening 524. As shown in FIG. 9, housing rivet opening 524 may have similar varying diameters so that the head 708 of rivet 204 may be at least partially countersunk within housing rivet opening 524, assisting in keeping the rivet 204 in place within the housing rivet opening 524 once inserted.

Figure 15:
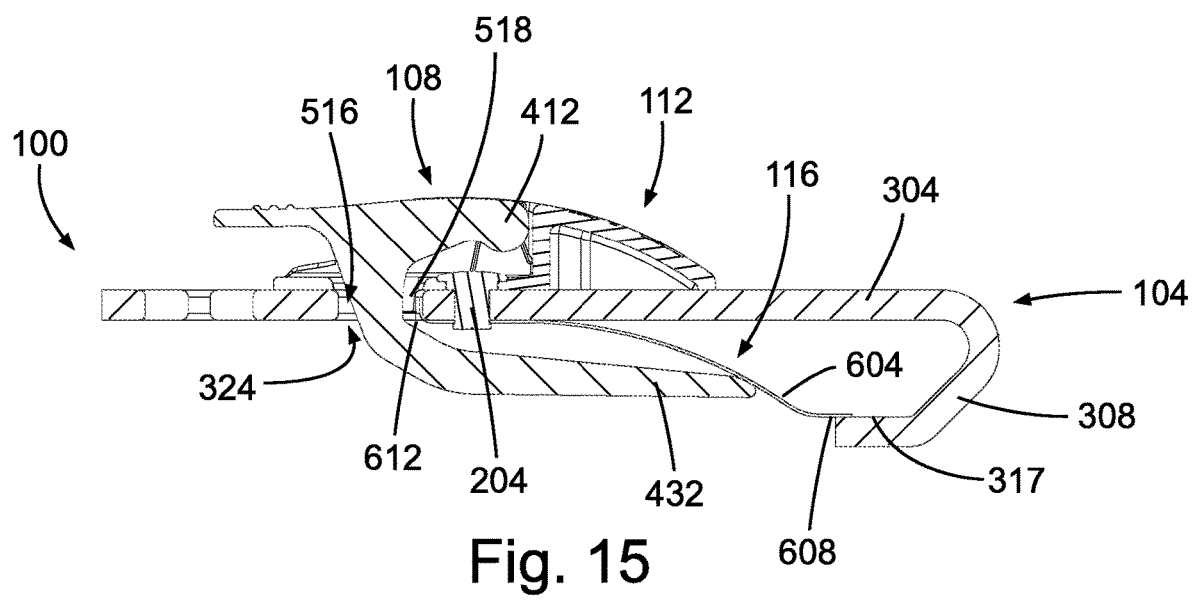
FIG. 15 is a cross-sectional side view of the snap hook assembly of FIG. 1.

A cross-sectional side view of the snap hook assembly 100 in a closed position is shown in FIG. 15. The housing 112 is positioned on the top surface of the body portion 304 of the base assembly 104, while one end of the clasp 116 is positioned on the bottom surface of the body portion 304 of the base assembly 104. The housing 112 and the clasp 116 are held to the base assembly 104 by rivet 204, which extends through the rivet openings 328, 524, and 616. The clasp tab 612 is fit within the base lever opening 324 when the clasp 116 is attached to the base assembly 104. The curved shape of the clasp 116 allows the clasp 116 to extend from the bottom surface of the base assembly 104 at the end near rivet 204 to the hook 308 of the body portion 304 where the clasp foot 608 rests on the upper foot surface 317 when the snap hook assembly 100 is in a closed position. The resiliency of clasp 116 biases the clasp 116 to the closed position where clasp foot 608 is on or very near the upper foot surface 317.

The lever assembly 108 is positioned with respect to the base assembly 104 and the housing 112 so that the arm 432 of the lever assembly 108 is inserted through the base lever opening 324 and the housing lever opening 516. The pentagonal shapes of the base lever opening 324 and the housing lever opening 516 provide clearance for the lower ridge 440 of the lever assembly 108 to fit through each of the lever openings 324, 516. The actuation mechanism 404 of the lever assembly 108 is positioned above the top surface of the body portion 304 of the base assembly 104 so that a portion of the actuation mechanism 404 is within the housing cavity 508. The pins 412 are located within the pin openings 512, allowing lever assembly 108 to pivot with respect to the housing 112 and the base assembly 104. The arm 432 extends to contact the clasp 116. As can be seen, the arm 432 is shorter than the clasp 116 such that the clasp 116 opens and closes the hook 308. Without any outside force, the clasp 116 remains biased to the closed position. While the arm 432 does not directly engage to close the hook 308, the end of the arm 432 contacts the clasp body 604 to brace the clasp 116 when contacting the foot surface 317 in the closed position. As shown, the hook 308 extends farther below the body portion 304 than the arm 432 of the lever assembly 108, and the clasp body 604 extends at an acute angle from the body portion 304 such that the clasp 116 is biased to engage the foot portion 316 of the hook 308. In the depicted example, the arm 432 is shorter than the hook 308 and recessed from the hook 308 to form a gap between the end of the arm 432 and the foot portion 316 of the hook 308. The gate 116 is exposed in the gap between the end of the arm 432 and the foot portion 316 of the hook 308 to allow sliding engagement of the anchor to move the gate 116 to the open position. This configuration allows the snap hook assembly 100 to be clipped onto the anchor without the user needing to press the actuation portion 416 of the lever assembly 108, though the user can do so if they wish.

Figure 16A:
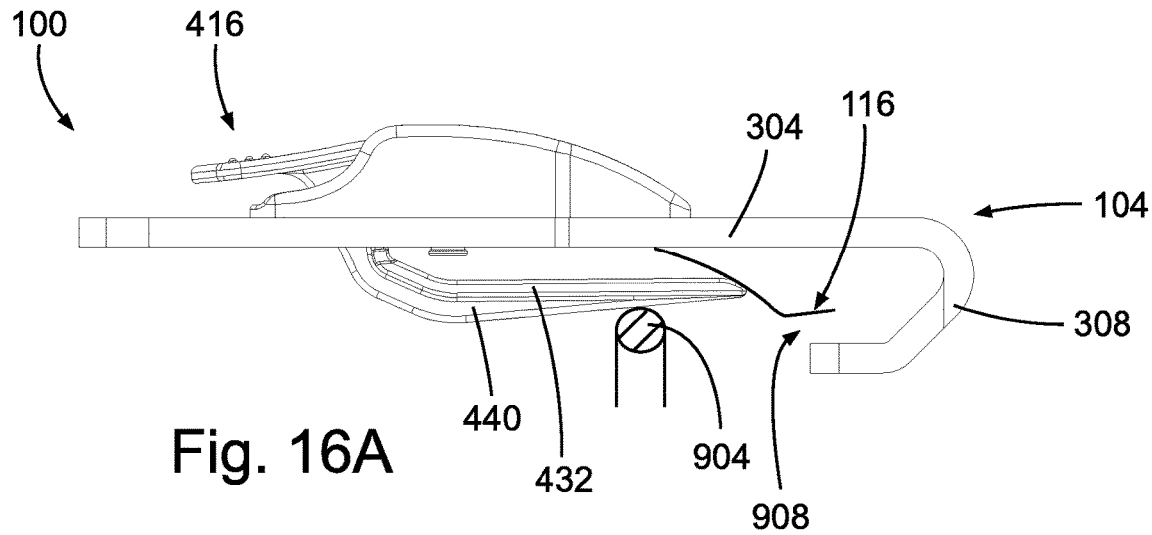
FIG. 16A is a side view of the snap hook assembly of FIG. 1 in a partially open position.
Figure 16B:
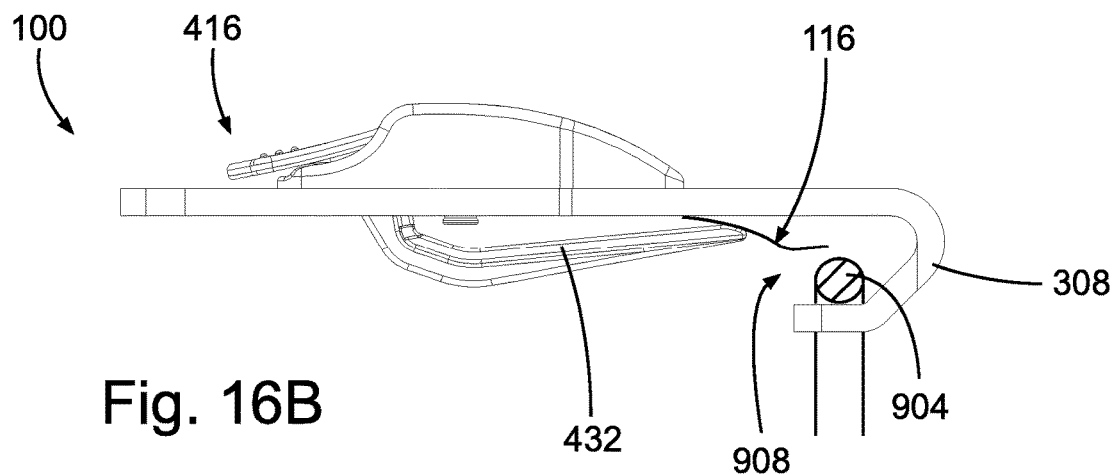
FIG. 16B is a side view of the snap hook assembly of FIG. 1 in an open position.
Figure 16C:
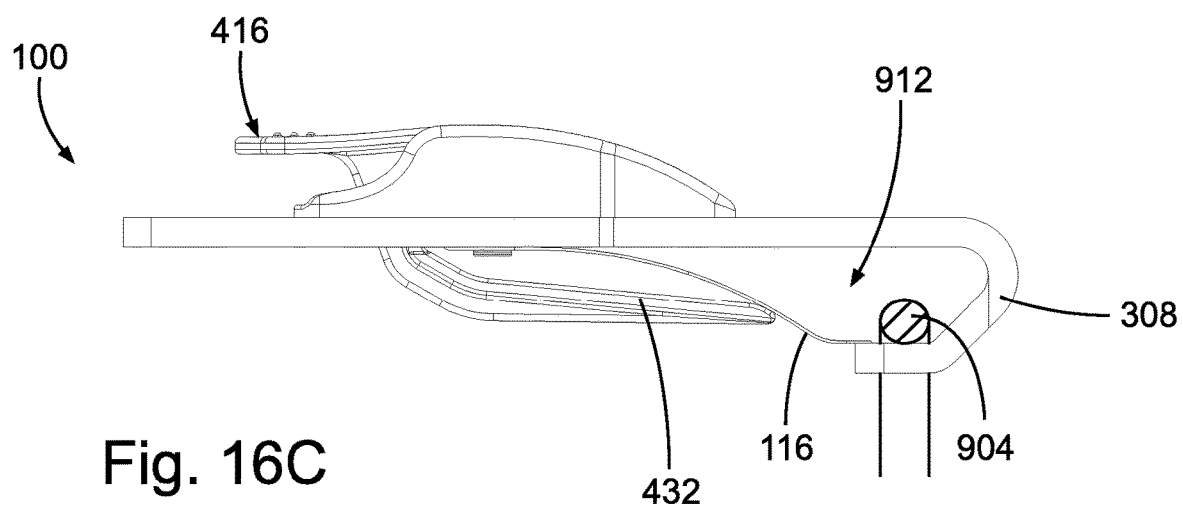
FIG. 16C is a side view of the snap hook assembly of FIG. 1 in a closed position.

FIGS. 16A, 16B, and 16C illustrate how the snap hook assembly 100 is attached to an anchor of a vehicle seat to secure a car seat to the vehicle seat. FIG. 16A shows the snap hook assembly 100 in the process of being hooked to an anchor 904. To begin adjusting the snap hook assembly 100 from the closed position to an open position, a user presses down on the button 416, causing the lever assembly 108 to pivot about the pin 412 (See FIG. 15). When the lever assembly 108 pivots upon pressing the button 416, the arm 432 begins to rotate toward the bottom surface of the body portion 304 of the base assembly 104 (counter-clockwise in the view shown in FIG. 16A). As long as enough force is applied to button 416 is enough to overcome the biasing force of clasp 116, the arm 432 raises clasp 116 with respect to the hook 308 to create a gap or crevice 908 between the clasp 116 and the hook 308.

In some embodiments, it may be unnecessary to apply force to the button 416 to overcome the biasing force of the clasp 116. Instead, the force needed to overcome the biasing force may be supplied by the anchor 904 as the anchor 904 is pressed against the arm 432 of the lever assembly 108. The lower ridge 440 of the arm 432 may act as a camming surface, guiding the anchor 904 toward the gap 908. As the anchor 904 is slid along and pressed against the lower ridge 440 of the arm 432, the force from the anchor causes the arm 432 to rotate toward the body portion 304 of the base assembly 104, also rotating the clasp 116 to create the gap 908.

FIG. 16B shows the snap hook assembly 100 in a fully open position with button 416 completely depressed. In the fully open position, the clasp 116 is raised above the foot surface 317 of the hook 308 so that the gap 908 between the clasp 116 and the hook 308 is large enough to allow anchor 904 to pass between. Once the anchor 904 has been inserted through gap 908 so that the anchor 904 is within the hook 308, the pressure applied to the button 416 may be released. The biasing force of the clasp 116 causes the clasp 116 and the arm 432 to rotate away from the bottom surface of the body portion 304 of the base assembly 104 so that the snap hook assembly 100 returns to a closed position. In the closed position, shown in FIG. 16C, the anchor 904 is trapped within a pocket 912 formed between the hook 308 of the base assembly 104 and the clasp 116. The removal of the gap 908 between the clasp 116 and the hook 308 keeps anchor 904 within the pocket 912 and prevents anchor 904 from being disengaged from the snap hook assembly 100.

To remove the anchor 904 from snap hook assembly 100, the process shown in FIGS. 16A, 16B, and 16C is repeated. A user presses on the button 416 to cause the arm 432 and clasp 116 to rotate toward the bottom surface of the body portion 304 of the base assembly 104 and create the gap 908 between the clasp 116 and the hook 308. The user then moves snap hook assembly 100 while the clasp 116 is in an open position so that the anchor 904 moves out of the pocket 912 and through the gap 908 until the anchor 904 is clear of the foot portion 316 of the hook 308. Once the anchor 904 is clear of the hook 308, the user releases the force on the button 416 to return the snap hook assembly 100 to a closed position.

Figure 17:
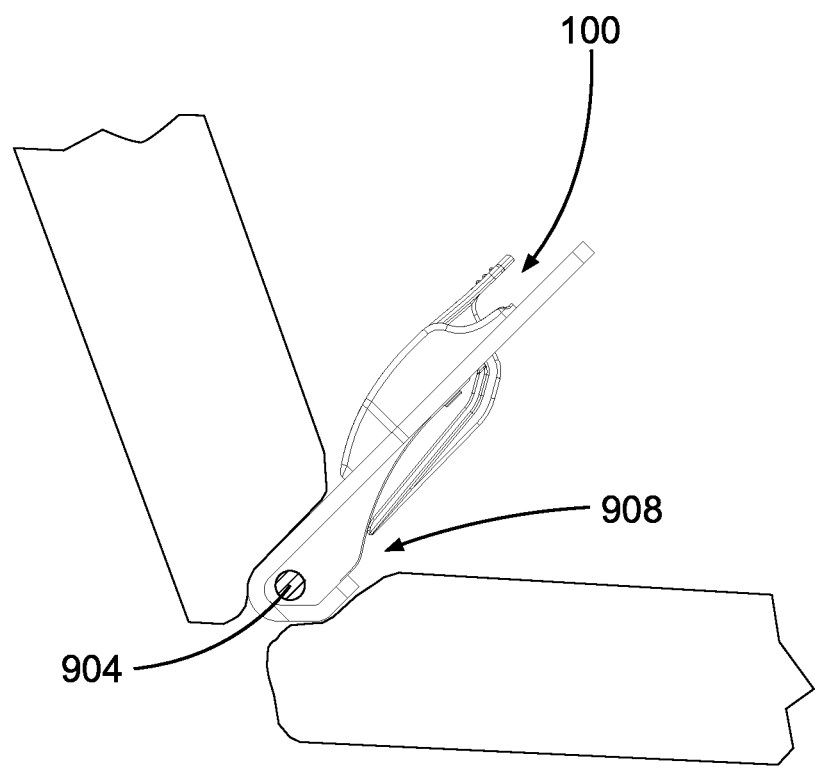
FIG. 17 is a side view of the snap hook assembly of FIG. 1 attached to an anchor of the seat of a vehicle.

As seen in FIG. 17, the snap hook assembly 100 may be used as an attachment for a car seat, booster seat, or any other item that needs to be secured in the vehicle. Because the anchor 904 is typically located in the crevice 908 between the back and the chair of the seat, it can be difficult to reach the anchor 904 when attempting to attach an object to the anchor 904. Instead of forcing a user to apply pressure to the clasp 116 which is positioned near the anchor 904, and therefore deep within the crevice 908 formed in the seat when being installed, pressing on the button 416 allows a user to keep his or her hand out of the crevice 908 in the seat. Keeping a hand of the user out of the crevice 908 allows greater freedom of movement and allows the snap hook assembly 100 to be more easily attached to the anchor 904.

Additionally, by using the resilient clasp 116 as the biasing force that keeps the snap hook assembly 100 in a closed position rather than having a separate biasing element such as a spring in the housing 112, the snap hook assembly 100 can maintain a low profile. Because the crevice 908 between the back and the chair of the seat is generally small and maintains a tight fit, a hook with a higher or larger profile may be difficult to install on the anchor 904. The low profile of the snap hook assembly 100 makes it easier to slide snap hook assembly 100 into the crevice 908 in the seat to attach the snap hook assembly 100 to the anchor 904.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Acute Angle" generally refers to an angle smaller than a right angle or less than 90 degrees.

"Asymmetric" generally refers to an object not being identical on both sides of a central line.

"Cantilever Spring" generally refers to a spring fixed only at one end. In one non-limiting example, the cantilever spring is in the form of a flat spring that is anchored at one and the other end extends freely away from the anchored end.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Flat Spring" generally refers to a flat strip of material that, when deflected by an external load, stores and releases energy. In one non-limiting example, flat springs include small, stamped metal components that function like a spring by controlling deflection within small or restricted spaces. Flat springs can also function as spacers and/or electrical contacts. Flat springs usually, but not always, are manufactured from high carbon spring steel, nickel-silver, high-nickel alloys, stainless steel, phosphor-bronze, and/or beryllium-copper combinations.

"Hook" generally refers to a length of material that contains a portion that is curved and/or indented, such that it can be used to grab onto, connect, or otherwise attach itself onto another object. In one non-limiting example, the hook includes a piece of material, such as made of metal and/or plastic, that is curved or otherwise bent back at an angle, for catching hold of another object.

"Lateral" generally refers to being situated on, directed toward, or coming from the side.

"Lever" generally refers to a simple machine including a beam, rod, or other structure pivoted at a fulcrum, such as a hinge. In one form, the lever is a rigid body capable of rotating on a point on itself. Levers can be generally categorized into three types of classes based on the location of fulcrum, load, and/or effort. In a class 1 type of lever, the fulcrum is located in the middle such that the effort is applied on one side of the fulcrum and the resistance or load on the other side. For class 1 type levers, the mechanical advantage may be greater than, less than, or equal to 1. Some non-limiting examples of class 1 type levers include see-saws, crowbars, and a pair of scissors. In a class 2 type of lever, which is sometimes referred to as a force multiplier lever, the resistance or load is located generally near the middle of the lever such that the effort is applied on one side of the resistance and the fulcrum is located on the other side. For class 2 type levers, the load arm is smaller than the effort arm, and the mechanical advantage is typically greater than 1. Some non-limiting examples of class 2 type levers include wheelbarrows, nutcrackers, bottle openers, and automobile brake pedals. In a class 3 type lever, which is sometimes referred to as a speed multiplier lever, the effort is generally located near the middle of the lever such that the resistance or load is on one side of the effort and the fulcrum is located on the other side. For class 3 type levers, the effort arm is smaller than the load arm, and the mechanical advantage is typically less than 1. Some non-limiting examples of class 3 type levers include a pair of tweezers and the human mandible.

"Longitudinal" generally relates to length or lengthwise dimension of an object, rather than across.

"Seat Belt", "Safety Belt", or "Vehicle Belt" generally refers to an arrangement of webs and other devices designed to restrain or otherwise hold a person or other object steady such as in a boat, vehicle, aircraft, and/or spacecraft. For example, the seat belt is designed to secure an occupant of a vehicle against harmful movement that may result during a collision or a sudden stop. By way of non-limiting examples, the seat belt can include webbing, buckles, latch plates, and/or length-adjustment mechanisms, such as a retractor, installed in the vehicle that is used to restrain an occupant or a child restraint system. The seat belt for instance can include a lap belt only, a combination lap-shoulder belt, a separate lap belt, a separate shoulder belt, and/or a knee bolster.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Web" or "Webbing" generally refers to a strap made of a network of thread, strings, cords, wires, and/or other materials designed to restrain or otherwise hold a person or other object steady such as in a boat, vehicle, aircraft, and/or spacecraft. By way of non-limiting examples, the web can be incorporated into a seat belt, a child booster seat, and/or a car seat.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A snap hook assembly, comprising:
   a base having a hook;
   a gate having a fixed end secured to the base and a free end extending from the fixed end towards the hook, wherein the gate is resiliently biased to a closed position where the free end of the gate closes against the hook;
   a gate actuator having an actuator portion and an arm contacting the gate, wherein the arm is configured to move the gate from the closed position to an open position where the free end of the gate disengages from the hook; a housing secured to the base on a side that is opposite the hook, wherein the housing defines one or more pivot pin openings;
   wherein the gate actuator includes
      one or more pivot pins pivotally secured in the one or more pivot pin openings of the housing, and
      an arm contacting the gate to move the free end from the closed position to the open position;

wherein the actuator portion is located on the same side of the base as the housing;
wherein the base defines a base lever opening; and
wherein the arm extends through the base lever opening to engage the gate proximal to the hook.

2. The assembly of claim 1, further comprising:
a single fastener securing the housing, the base, and the gate together.

3. The assembly of claim 1, wherein:
the housing defines a housing lever opening;
the arm extends through the housing lever opening;
the housing has one or more tabs that extend through the base lever opening; and
the arm has one or more stop flanges configured to engage the tabs to limit movement of the arm.

4. The assembly of claim 1, wherein:
the arm has a gate facing flange and a support rib arranged in a T-shaped configuration; and
the support rib tapers towards the hook.

5. The assembly of claim 4, wherein the lever opening has a pentagonal shape to receive the support rib.

6. The assembly of claim 1, wherein the gate actuator extends through the base lever opening in a U-shaped curve from the pivot pins to the arm.

7. The assembly of claim 1, wherein the one or more pivot pins have beveled ends.

8. The assembly of claim 1, wherein the base is wider than the arm.

9. A vehicle restraint system, comprising:
a vehicle seat including a back section, a chair section, and a vehicle anchor located in a crevice between the back section and the chair section; and
a snap hook assembly including
a base having a web opening at one end and a hook at the opposite end, wherein the web opening is configured to receive webbing of a restraint system, wherein the hook is secured to the vehicle anchor,
a cantilevered spring having a fixed end secured to the base and a free end located opposite the fixed end, wherein the free end of the cantilevered spring is resiliently biased to a closed position against the hook to retain the vehicle anchor in the hook, and
a lever pivotally coupled to the base, wherein the lever has an arm contacting the cantilevered spring proximal to the hook, wherein the arm is configured to move the free end of the cantilevered spring from the closed position to an open position where the vehicle anchor is able to be received into the hook, wherein the arm has an actuation portion positioned on a side of the base opposite the hook to allow a user to move the free end of the cantilevered spring from the closed position to the open position.

10. The system of claim 9, wherein:
the hook has a foot portion with a foot surface located inside the hook; and
the cantilevered spring is a flat spring resiliently biased to contact the foot surface.

11. The system of claim 10, wherein:
the cantilevered spring extends at an acute angle from the base to the foot portion of the hook;
the arm has an end that engages the cantilevered spring between the free end and the fixed end;
the arm is shorter than the hook and recessed from the hook to form a gap between the end of the arm and the foot portion of the hook; and
the cantilevered spring is exposed in the gap between the end of the arm and the foot portion of the hook to allow sliding engagement of the anchor to move the cantilevered spring to the open position.

12. The system of claim 11, wherein the lever has a support rib against which the anchor slides to facilitate the lever acting as a class 3 lever when opening the cantilevered spring during the sliding engagement of the anchor.

13. The system of claim 9, further comprising:
a housing pivotally coupling the lever to the base; and
wherein the actuation portion is positioned relative to the housing and the arm to act as a class 1 lever type when the actuation portion is manually depressed.

14. The system of claim 13, wherein the cantilevered spring biases the actuation portion to an undepressed position.

15. The system of claim 13, wherein the arm is positioned to brace the cantilevered spring when in the closed position to reduce the risk of the free end of the cantilevered spring from being pried from the hook.

16. The system of claim 15, wherein:
the housing has one or more tabs; and
the arm has one or more stop flanges configured to engage the tabs to limit movement of the arm.

17. The system of claim 9, wherein:
the base defines a base lever opening; and
the arm extends through the base lever opening.

18. The system of claim 17, wherein the cantilevered spring has a clasp tab bent into the base lever opening.

19. The system of claim 9, wherein the lever has a curved portion that connects the actuation portion to the arm, wherein the curved portion spaces the lever out of contact from the cantilevered spring, wherein only a distal end of the arm that is opposite the curved portion contacts the cantilevered spring.

20. The system of claim 9, wherein the lever has a curved portion that connects the actuation portion to the arm, wherein the curved portion curves so that the arm is nearly parallel to the actuation portion.

21. The system of claim 9, wherein the lever has a curved portion that connects the actuation portion to the arm, wherein the arm has a cam surface against which the vehicle anchor presses to move the cantilevered spring to an open position.

22. A snap hook assembly, comprising:
a base having a hook;
a gate having a fixed end secured to the base and a free end extending from the fixed end towards the hook, wherein the gate is resiliently biased to a closed position where the free end of the gate closes against the hook;
a gate actuator having an actuator portion and an arm contacting the gate, wherein the arm is configured to move the gate from the closed position to an open position where the free end of the gate disengages from the hook;
a housing secured to the base, wherein the housing defines one or more pivot pin openings;
wherein the gate actuator includes
an actuator portion to manually actuate the gate actuator,
one or more pivot pins pivotally secured in the one or more pivot pin openings of the housing, and
an arm contacting the gate to move the free end from the closed position to the open position; and
a single fastener securing the housing, the base, and the gate together.

23. The assembly of claim 22, wherein:
the housing is secured to the base on a side that is opposite the hook;
the actuator portion is located on the same side of the base as the housing;
the base defines a base lever opening; and
the arm extends through the base lever opening to engage the gate proximal to the hook.

24. The assembly of claim 23, wherein:
the housing defines a housing lever opening;
the arm extends through the housing lever opening;
the housing has one or more tabs that extend through the base lever opening; and
the arm has one or more stop flanges configured to engage the tabs to limit movement of the arm.

25. The assembly of claim 23, wherein:
the arm has a gate facing flange and a support rib arranged in a T-shaped configuration;
and the support rib tapers towards the hook.

26. The assembly of claim 25, wherein the lever opening has a pentagonal shape to receive the support rib.

27. The assembly of claim 23, wherein the gate actuator extends through the base lever opening in a U-shaped curve from the pivot pins to the arm.

28. The assembly of claim 22 wherein the one or more pivot pins have beveled ends.

29. The assembly of claim 22, wherein the base is wider than the arm.

30. A snap hook assembly, comprising:
a base having a hook;
a gate having a fixed end secured to the base and a free end extending from the fixed end towards the hook, wherein the gate is resiliently biased to a closed position where the free end of the gate closes against the hook;
a gate actuator having an actuator portion and an arm contacting the gate, wherein the arm is configured to move the gate from the closed position to an open position where the free end of the gate disengages from the hook;
a housing secured to the base, wherein the housing defines one or more pivot pin openings;
wherein the gate actuator includes
an actuator portion to manually actuate the gate actuator,
one or more pivot pins pivotally secured in the one or more pivot pin openings of the housing, and
an arm contacting the gate to move the free end from the closed position to the open position; and
wherein the one or more pivot pins have beveled ends.

31. The assembly of claim 30, wherein:
the housing is secured to the base on a side that is opposite the hook;
the actuator portion is located on the same side of the base as the housing;
the base defines a base lever opening; and
the arm extends through the base lever opening to engage the gate proximal to the hook.

32. The assembly of claim 31, wherein:
the arm has a gate facing flange and a support rib arranged in a T-shaped configuration;
and the support rib tapers towards the hook.

33. The assembly of claim 32, wherein the lever opening has a pentagonal shape to receive the support rib.

34. The assembly of claim 31, wherein the gate actuator extends through the base lever opening in a U-shaped curve from the pivot pins to the arm.

35. The assembly of claim 31, wherein:
the housing defines a housing lever opening;
the arm extends through the housing lever opening;
the housing has one or more tabs that extend through the base lever opening; and
the arm has one or more stop flanges configured to engage the tabs to limit movement of the arm.

36. The assembly of claim 30, wherein the one or more pivot pins have beveled ends.

37. The assembly of claim 30, wherein the base is wider than the arm.

38. A snap hook assembly, comprising:
a base having a web opening at one end and a hook at the opposite end, wherein the web opening is configured to receive webbing of a restraint system, wherein the hook is configured to be secured to a vehicle anchor;
a cantilevered spring having a fixed end secured to the base and a free end located opposite the fixed end, wherein the free end of the cantilevered spring is resiliently biased to a closed position against the hook to retain the vehicle anchor in the hook; and
a lever pivotally coupled to the base, wherein the lever has an arm contacting the cantilevered spring proximal to the hook, wherein the arm is configured to move the free end of the cantilevered spring from the closed position to an open position where the vehicle anchor is able to be received into the hook, wherein the arm has an actuation portion positioned on a side of the base opposite the hook to allow a user to move the free end of the cantilevered spring from the closed position to the open position;
wherein the hook has a foot portion with a foot surface located inside the hook;
wherein the cantilevered spring is a flat spring resiliently biased to contact the foot surface;
wherein the cantilevered spring extends at an acute angle from the base to the foot portion of the hook;
wherein the arm has an end that engages the cantilevered spring between the free end and the fixed end;
wherein the arm is shorter than the hook and recessed from the hook to form a gap between the end of the arm and the foot portion of the hook;
wherein the cantilevered spring is exposed in the gap between the end of the arm and the foot portion of the hook to allow sliding engagement of the anchor to move the cantilevered spring to the open position; and
wherein the lever has a support rib against which the anchor slides to facilitate the lever acting as a class 3 lever when opening the gate during the sliding engagement of the anchor.

39. The system of claim 38, further comprising:
a housing pivotally coupling the lever to the base; and
wherein the actuation portion is positioned relative to the housing and the arm to act as a class 1 lever type when the actuation portion is manually depressed.

40. The system of claim 39, wherein the cantilevered spring biases the actuation portion to an undepressed position.

41. The system of claim 39, wherein the arm is positioned to brace the cantilevered spring when in the closed position to reduce the risk of the free end of the cantilevered spring from being pried from the hook.

42. The system of claim 41, wherein:
the housing has one or more tabs; and
the arm has one or more stop flanges configured to engage the tabs to limit movement of the arm.

43. A snap hook assembly, comprising:
a base having a web opening at one end and a hook at the opposite end, wherein the web opening is configured to receive webbing of a restraint system, wherein the hook is configured to be secured to a vehicle anchor;
a cantilevered spring having a fixed end secured to the base and a free end located opposite the fixed end, wherein the free end of the cantilevered spring is resiliently biased to a closed position against the hook to retain the vehicle anchor in the hook; and
a lever pivotally coupled to the base, wherein the lever has an arm contacting the cantilevered spring proximal to the hook, wherein the arm is configured to move the free end of the cantilevered spring from the closed position to an open position where the vehicle anchor is able to be received into the hook, wherein the arm has an actuation portion positioned on a side of the base opposite the hook to allow a user to move the free end of the cantilevered spring from the closed position to the open position;
wherein the base defines a base lever opening; and
wherein the arm extends through the base lever opening.

44. The system of claim 43, further comprising:
a housing pivotally coupling the lever to the base; and
wherein the actuation portion is positioned relative to the housing and the arm to act as a class 1 lever type when the actuation portion is manually depressed.

45. The system of claim 44, wherein the cantilevered spring biases the actuation portion to an undepressed position.

46. The system of claim 44, wherein the arm is positioned to brace the cantilevered spring when in the closed position to reduce the risk of the free end of the cantilevered spring from being pried from the hook.

47. The system of claim 46, wherein:
the housing has one or more tabs; and
the arm has one or more stop flanges configured to engage the tabs to limit movement of the arm.

* * * * *